(12) United States Patent
Weiner

(10) Patent No.: US 10,377,352 B2
(45) Date of Patent: Aug. 13, 2019

(54) VEHICLE ROTATION ASSEMBLY

(71) Applicant: Alan Weiner, Los Angeles, CA (US)

(72) Inventor: Alan Weiner, Los Angeles, CA (US)

(*) Notice: Subject to any disclaimer, the term of this patent is extended or adjusted under 35 U.S.C. 154(b) by 253 days.

(21) Appl. No.: 15/387,202

(22) Filed: Dec. 21, 2016

(65) Prior Publication Data

US 2018/0170324 A1   Jun. 21, 2018

(51) Int. Cl.
*B60S 13/02* (2006.01)

(52) U.S. Cl.
CPC ..................... *B60S 13/02* (2013.01)

(58) Field of Classification Search
CPC ......... B61J 1/00; B61J 1/02; B61J 1/04; B61J 1/12; B61J 3/00; B61J 3/06
See application file for complete search history.

(56) References Cited

U.S. PATENT DOCUMENTS

| | | | |
|---|---|---|---|
| 1,562,853 A * | 11/1925 | Schonberger | B60S 13/02 104/45 |
| 4,901,647 A | 2/1990 | Drabing | |
| 6,457,746 B1 | 10/2002 | Schepers | |
| D527,160 S | 8/2006 | Yatsko et al. | |
| 7,473,061 B1 | 1/2009 | Santangelo | |
| 7,784,760 B2 | 8/2010 | Ramsey | |
| 8,205,557 B2 | 6/2012 | Moore | |
| 2003/0215313 A1 | 11/2003 | Hinkle | |
| 2003/0233958 A1 | 12/2003 | D'Alessandro, Jr. | |

* cited by examiner

*Primary Examiner* — Robert J McCarry, Jr.

(57) ABSTRACT

A vehicle rotation assembly for selectively rotating a vehicle includes a base that may be positioned on a support surface. A rotation unit is coupled to the base and the rotation selectively rotates on the base. A panel is coupled to the rotation unit such that the panel is selectively rotatable on the base. A vehicle is selectively positioned on the panel thereby facilitating the vehicle to be selectively rotated.

4 Claims, 4 Drawing Sheets

VEHICLE ROTATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to rotation devices and more particularly pertains to a new rotation device for selectively rotating a vehicle.

BRIEF SUMMARY OF THE INVENTION

An embodiment of the disclosure meets the needs presented above by generally comprising a base that may be positioned on a support surface. A rotation unit is coupled to the base and the rotation selectively rotates on the base. A panel is coupled to the rotation unit such that the panel is selectively rotatable on the base. A vehicle is selectively positioned on the panel thereby facilitating the vehicle to be selectively rotated.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
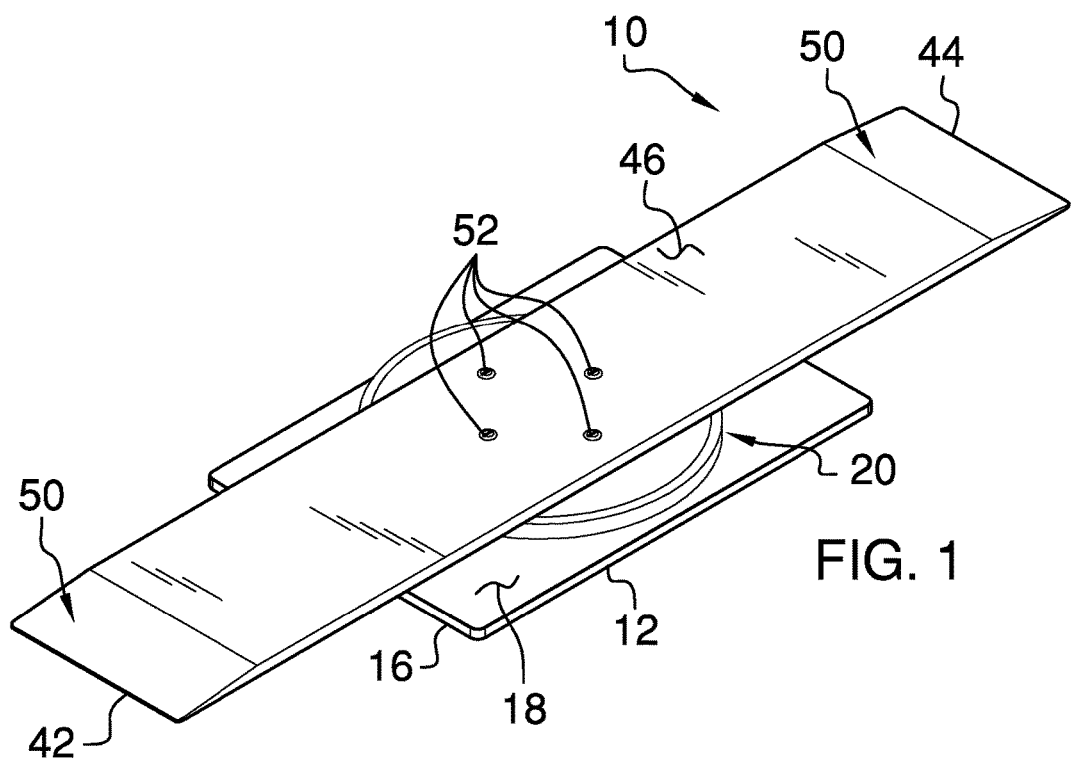
FIG. 1 is a top perspective view of a vehicle rotation assembly according to an embodiment of the disclosure.
Figure 2:
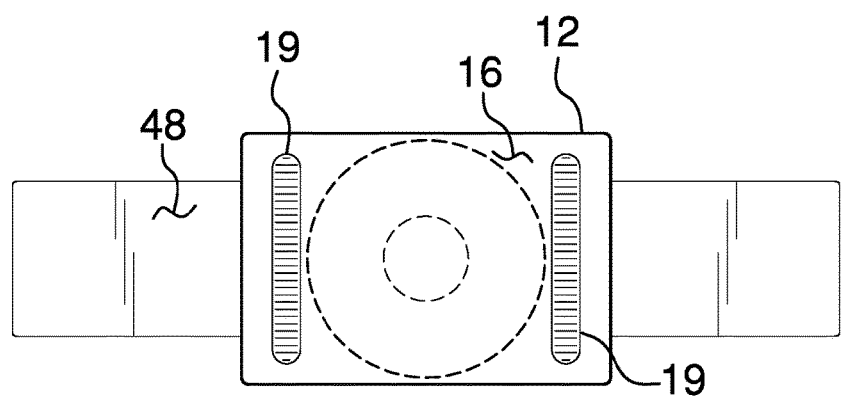
FIG. 2 is a bottom phantom view of an embodiment of the disclosure.
Figure 3:
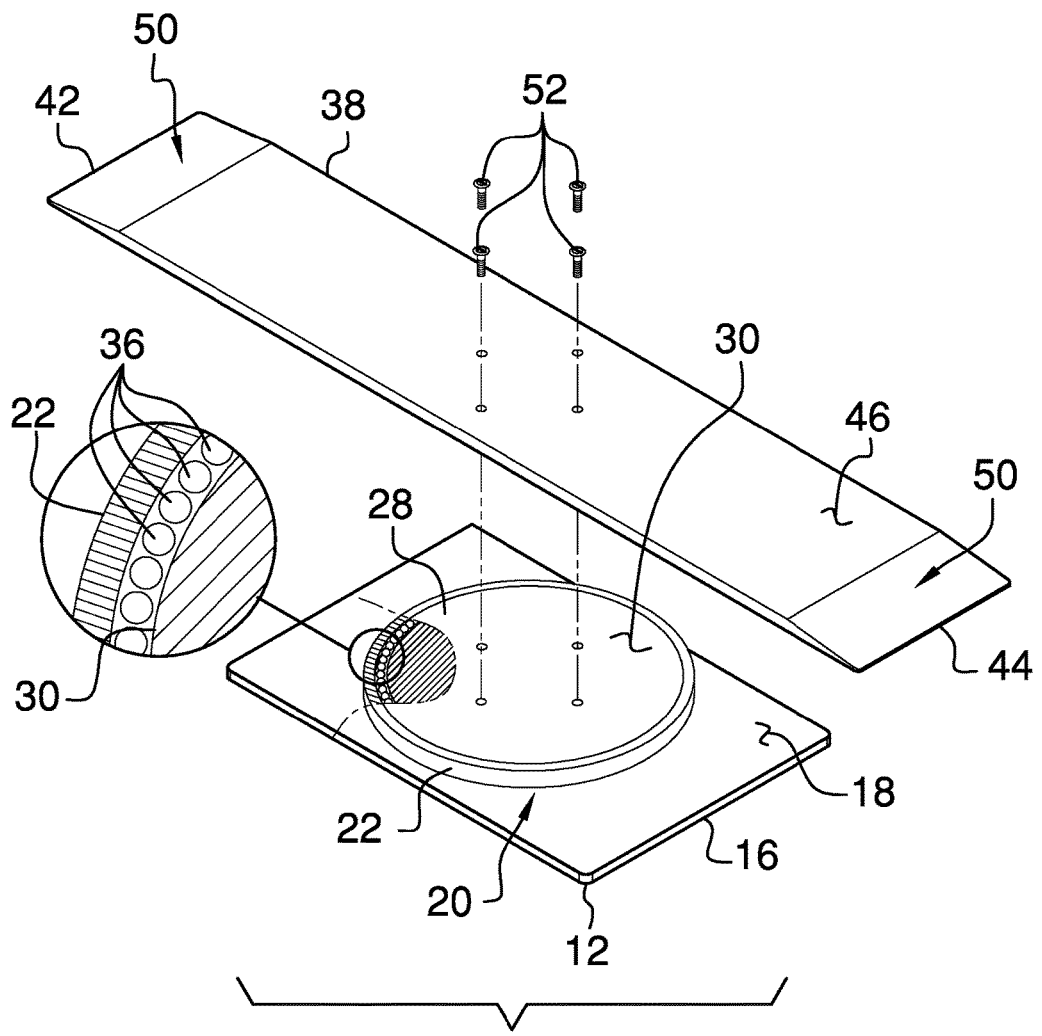
FIG. 3 is an exploded perspective view of an embodiment of the disclosure.
Figure 4:
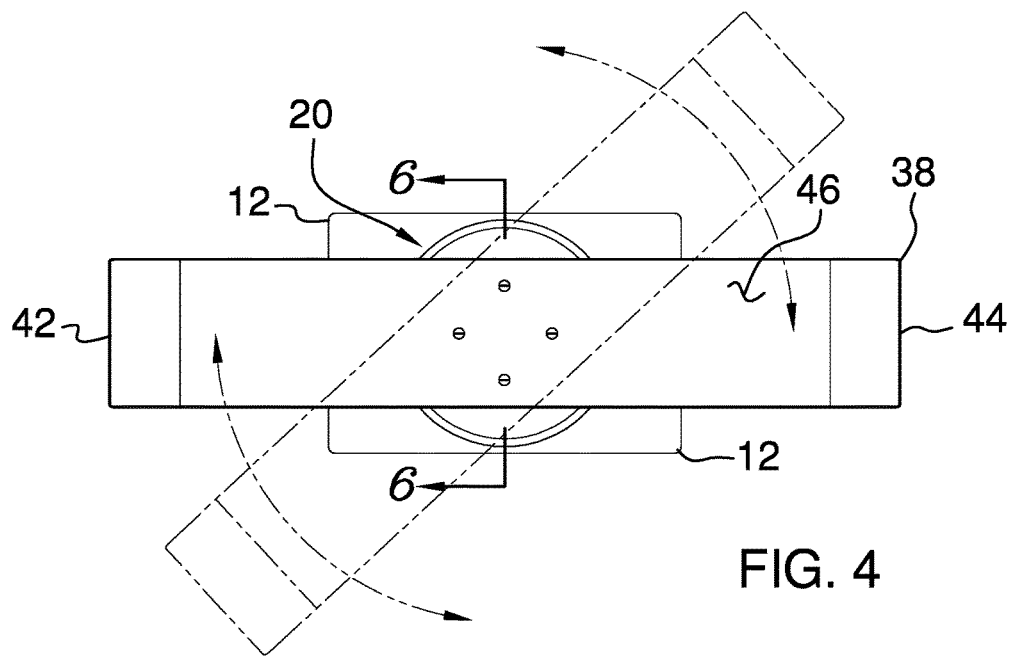
FIG. 4 is a top view of an embodiment of the disclosure.
Figure 5:
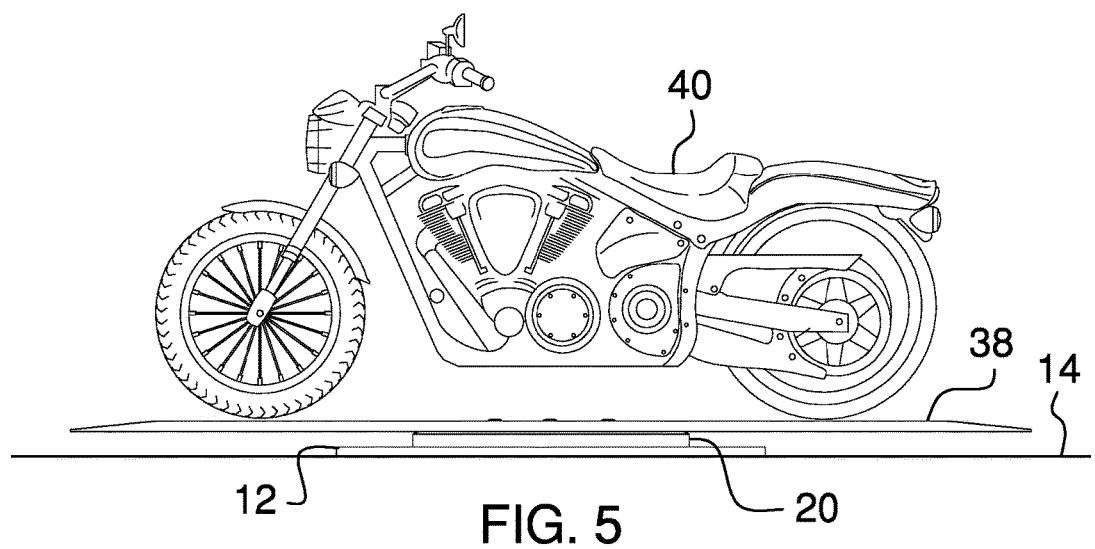
FIG. 5 is a perspective in-use view of an embodiment of the disclosure.
Figure 6:
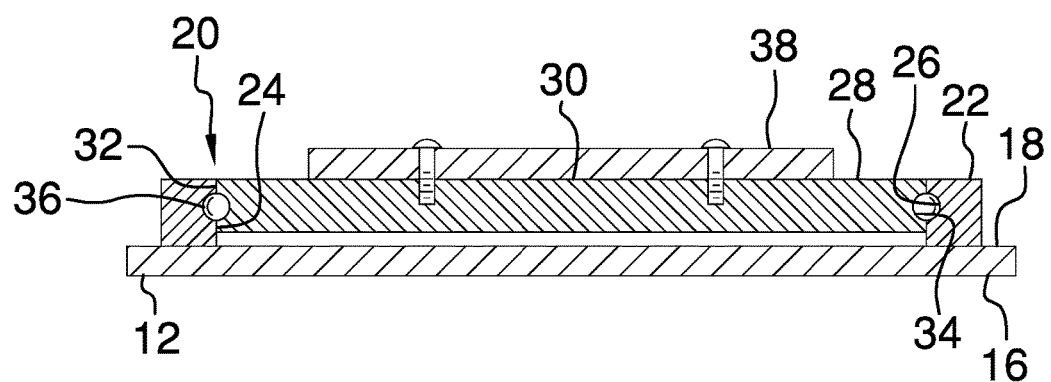
FIG. 6 is a cross sectional view taken along line 6-6 of FIG. 4 of an embodiment of the disclosure.

With reference now to the drawings, and in particular to FIGS. 1 through 6 thereof, a new rotation device embodying the principles and concepts of an embodiment of the disclosure and generally designated by the reference numeral 10 will be described.

As best illustrated in FIGS. 1 through 6, the vehicle rotation assembly 10 generally comprises a base 12 that may be positioned on a support surface 14. The support surface 14 may be ground, a floor in a garage or any other surface capable of supporting a vehicle 40. The base 12 has a first surface 16 and a second surface 18 and the first surface 16 abuts the support surface 14.

A pair of grips 19 is provided and each of the grips 19 is coupled to the first surface 16 of the base 12. The grips 19 are spaced apart from each other and each of the grips 19 is comprised of a resiliently compressible material. Moreover, each of the grips 19 frictionally engages the support surface 14 thereby inhibiting the base 12 from sliding on the support surface 14.

A rotation unit 20 is coupled to the base 12 and the rotation selectively rotates on the base 12. The rotation unit 20 comprises a ring 22 that is coupled to the second surface 18 of the base 12. The ring 22 is centrally positioned on the base 12 and the ring 22 has an inwardly facing surface 24. The inwardly facing surface 24 has a first groove 26 therein and the first groove 26 is coextensive with the ring 22.

A disk 28 is provided that has a top surface 30 and a perimeter edge 32. The perimeter edge 32 has second groove 34 extending toward a center of the disk 28 and the second groove 34 is coextensive with the perimeter edge 32. The disk 28 is positioned in the ring 22 having the second groove 34 being aligned with the first groove 26.

A plurality of bearings 36 is provided and each of the bearings 36 is movably positioned in the first groove 26 and the second groove 34. In this way the disk 28 may be rotated about a vertical axis extending through the first surface 16 and the second surface 18 of the base 12. Each of the bearings 36 may be ball bearings 36 or the like. Additionally, the disk 28 is spaced from the second surface 18 of the base 12 thereby inhibiting the disk 28 from frictionally engaging the base 12.

A panel 38 is provided and the panel 38 coupled to the rotation unit 20 such that the panel 38 is selectively rotatable on the base 12. A vehicle 40 may be positioned on the base 12 thereby facilitating the vehicle 40 to be selectively rotated. The vehicle 40 may be a motorcycle or other two wheeled vehicle 40. The panel 38 has a first end 42, a second end 44, an upper surface 46 and a lower surface 48. The panel 38 is elongated between the first end 42 and the second end 44. The lower surface 48 abuts the top surface 30 of the disk 28 and the disk 28 is centrally positioned in the panel 38.

The upper surface 46 tapers downwardly to the lower surface 48 adjacent to each of the first end 42 and the second end 44 to define a pair of ramps 50. Each of the ramps 50 facilitates the vehicle 40 to be driven onto and off of the panel 38 having the vehicle 40 being positioned on the upper surface 46 of the panel 38. A plurality of fasteners 52 is provided and each of the fasteners 52 extends through the panel 38 and engages the disk 28 such that the panel 38 is removably retained on the disk 28. Each of the fasteners 52 may be a bolt of the like.

In use, the base 12 is placed on the support surface 14 in a selected location such as a garage or other area commonly used to park vehicles. The vehicle 40 is driven onto the panel 38 when the vehicle 40 is parked. The vehicle 40 is selectively manipulated to rotate the panel 38 and the vehicle 40 on the base 12. In this way the vehicle 40 is oriented to be driven out of the selected location in the same direction the vehicle 40 was driven into the selected location without having to manually turn the vehicle 40 around. Thus, the possibility of tipping the vehicle 40 over when the vehicle 40 is manually turned around is reduced.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle rotation assembly being configured to selectively rotate a vehicle, said assembly comprising:
  a base being configured to be positioned on a support surface, said base having a first surface and a second surface, said first surface being configured to abut the support surface, said second surface being planar, parallel to said first surface, and an uppermost surface of said base;
  a rotation unit being coupled to said base, said rotation selectively rotating on said base, said rotation unit comprising
    a ring being coupled to said base such that said ring extends upwardly from said second surface of said base, said ring being centrally positioned on said base, said ring having an inwardly facing surface, said inwardly facing surface having a first groove therein, said first groove being coextensive with said ring,
    a disk having a top surface and a perimeter edge, said perimeter edge having a second groove extending toward a center of said disk, said second groove being coextensive with said perimeter edge, said disk being positioned in said ring having said second groove being aligned with said first groove, and
    a plurality of bearings, each of said bearings being positioned in said first groove and said second groove thereby facilitating said disk to be rotated about a vertical axis perpendicular to said disk; and
  a panel being coupled to said rotation unit such that said panel is selectively rotatable on said base, said panel being configured to have a vehicle positioned thereon thereby facilitating the vehicle to be selectively rotated.

2. The assembly according to claim 1, wherein said panel has a first end, a second end, an upper surface and a lower surface, said upper surface of said panel being sloped approaching said first end and said second end, said lower surface abutting said top surface of said disk having said disk being centrally positioned in said panel, said upper surface being configured to have the vehicle positioned thereon.

3. The assembly according to claim 2, further comprising a plurality of fasteners, each of said fasteners extending through said panel and engaging said disk such that said panel is removably retained on said disk.

4. A vehicle rotation assembly being configured to selectively rotate a vehicle, said assembly comprising:
  a base being configured to be positioned on a support surface, said base having a first surface and a second surface, said first surface being configured to abut the support surface, said second surface being planar, parallel to said first surface, and an uppermost surface of said base;
  a rotation unit being coupled to said base, said rotation selectively rotating on said base, said rotation unit comprising:
    a ring being coupled to said base such that said ring extends upwardly from said second surface of said base, said ring being centrally positioned on said base, said ring having an inwardly facing surface, said inwardly facing surface having a first groove therein, said first groove being coextensive with said ring,
    a disk having a top surface and a perimeter edge, said perimeter edge having second groove extending toward a center of said disk, said second groove being coextensive with said perimeter edge, said disk being positioned in said ring having said second groove being aligned with said first groove; and
    a plurality of bearings, each of said bearings being movably positioned in said first groove and said second groove thereby facilitating said disk to be rotated about a vertical axis extending through said first surface and said second surface of said base;
  a panel being coupled to said rotation unit such that said panel is selectively rotatable on said base, said panel being configured to have a vehicle positioned thereon thereby facilitating the vehicle to be selectively rotated, said panel having a first end, a second end, an upper surface and a lower surface, said panel being elongated between said first end and said second end wherein said first end and said second end each are laterally extended from an outer peripheral edge of said base, said upper surface of said panel being sloped approaching said first end and said second end, said lower surface abutting said top surface of said disk having said disk being centrally positioned in said panel, said upper surface being configured to have the vehicle positioned thereon; and a plurality of fasteners, each of said fasteners extending through said panel and engaging said disk such that said panel is removably retained on said disk.

\* \* \* \* \*